United States Patent [19]
Lodge

[11] 3,885,706
[45] May 27, 1975

[54] CASSETTE PUSHER VELOCITY REGULATOR

[75] Inventor: Edward H. Lodge, Wilmette, Ill.

[73] Assignee: Bell and Howell Company, Chicago, Ill.

[22] Filed: Aug. 20, 1973

[21] Appl. No.: 389,854

[52] U.S. Cl. .............................. 221/279; 352/123
[51] Int. Cl. ............................................. B65d 83/10
[58] Field of Search ........... 221/279, 280, 271, 268, 221/226; 352/123

[56] References Cited
UNITED STATES PATENTS
1,284,597  11/1918  Clinchy ............................. 221/279
3,220,787  11/1965  Latos ............................. 221/279 X
3,724,715  4/1973   Auriemma ...................... 221/279 X
3,767,083  10/1973  Webb ................................. 221/279
3,787,115  1/1974   Fischer ............................. 352/123

Primary Examiner—Allen N. Knowles
Attorney, Agent, or Firm—John E. Peele, Jr.; Roger M. Fitz-Gerald

[57] ABSTRACT

An apparatus is provided for regulating the motion of an assembly of cassettes during indexing of the cassettes relative to a projection station of a motion picture projector. The apparatus comprises means for applying displacement force to the assembly of cassettes, means for guiding the direction of displacement of the assembly of cassettes, and means for damping the acceleration and regulating the velocity of the cassettes during indexing.

13 Claims, 5 Drawing Figures

3,885,706

PATENTED MAY 27 1975

SHEET 1

CASSETTE PUSHER VELOCITY REGULATOR

BACKGROUND OF THE INVENTION

This invention relates generally to motion picture projectors utilizing film cassettes, and in particular, to an indexing mechanism for a movie projector capable of handling film stored in a plurality of cassettes.

Cassettes have been developed in order to store and retrieve film in an organized and convenient manner. The cassettes have been constructed such that two or more cassettes may be easily mechanically attached to each other to form a stack or column of cassettes.

Typically, as many as eight of the cassettes would be attached together for storage purposes. Thenceforth, the assembly of cassettes would be stored and retrieved as one unit.

Projectors for handling film stored in such an assembly of cassettes have been developed in order to accommodate a selection of a desired film without dislodging the attached cassettes from one another.

The assembly of a plurality of cassettes is placed in such a projector and an indexing mechanism provides the means for sequentially positioning each of the cassettes in the projection position.

One useful form of indexing mechanism is shown in copending U.S. patent application Ser. No. 220, 952 filed Jan. 26, 1972, now U.S. Pat. No. 3,787,115 and assigned to the assignee of the present invention. This mechanism comprises an escapement member having two pairs of stop members that are alternately placed in and out of engagement abutments on the cassette. Two negator springs apply displacement force to the cassettes by means of a pusher assembly. Typically, as the escapement member is depressed, one cassette moves into the projection position in the projector while the preceding one is moved out of the projection position.

In some instances, however, this mechanism imparts displacement velocities to the cassettes of such magnitude that the cassettes are sometimes damaged, separated into component parts, or dislodged one from the other.

The subject invention alleviates this problem by controlling the displacement velocity of the cassettes without producing a corresponding significant reduction in pusher force.

SUMMARY OF THE INVENTION

Apparatus according to the present invention may comprise a pusher assembly for applying displacement force to an assembly of cassettes during indexing. Typically, two negator springs would provide the energy needed for displacement of the cassettes. Stationary guide means are placed on opposite sides of the cassettes and the pusher assembly in order to allow longitudinal motion thereof within the guides only. Two idler gears are attached to the pusher assembly by shaft means and to the guide means by meshing of gear teeth with stationary guide teeth. A viscous medium is interposed between one side of each gear and the pusher assembly pressure plate. As the idler gears rotate, the viscous medium located between the gears and the pusher assembly pressure plate is sheared. Viscous damping results and regulated displacement velocity is achieved. These and other features of the invention will become apparent from the following detailed description and the appended drawings.

DETAILED DESCRIPTION OF THE INVENTION

A cassette indexing system requires the application of a displacement force to an assembly of cassettes in order to transport the cassettes from one position to another in a projector. Use of a pusher assembly containing negator springs provides an economical means for supplying the required displacement force. Problems inherent in the use of such a spring means consist of sharp acceleration and higher than desirable velocities which sometimes result in damage to the cassettes, separation of the cassettes into component parts, and dislodging of one or more of the cassettes from the assembly of cassettes. Desirable solutions to these problems should encompass means whereby the cassette assembly acceleration is damped and the velocity regulated without a corresponding significant reduction in pusher force.

The present invention solves the aforementioned problems by means of a cassette pusher restrainer.

Figure 1:
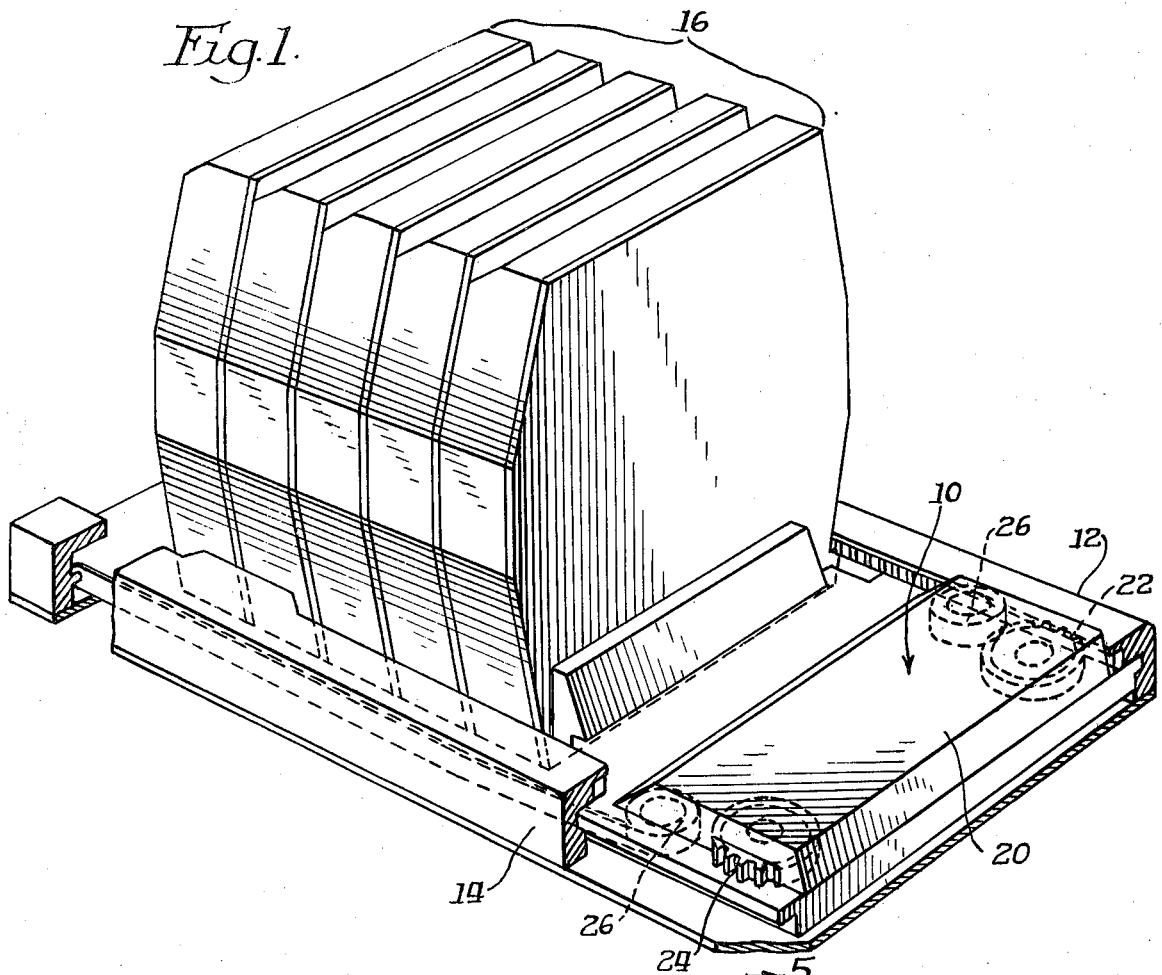
FIG. 1 is a perspective view of a cassette indexing apparatus including a pusher assembly.
Figure 2:
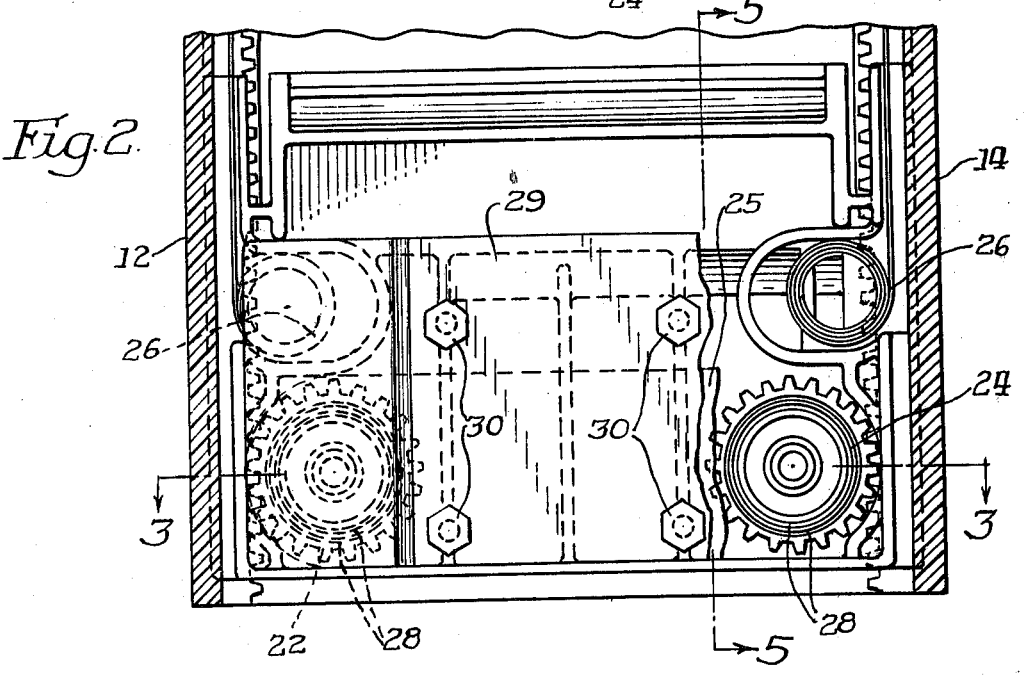
FIG. 2 is a bottom view of the pusher assembly shown in FIG. 1.
Figure 3:
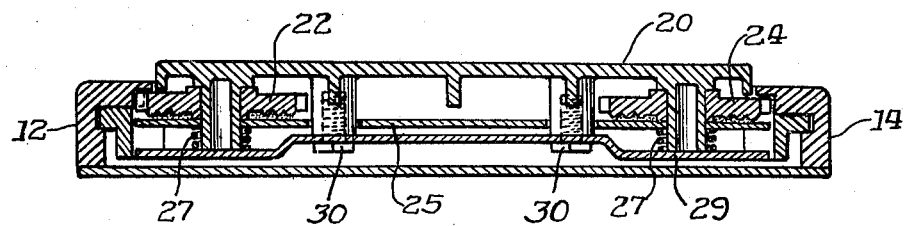
FIG. 3 is a cross-sectional view of the pusher assembly taken along lines 3—3 of FIG. 2.
Figure 4:
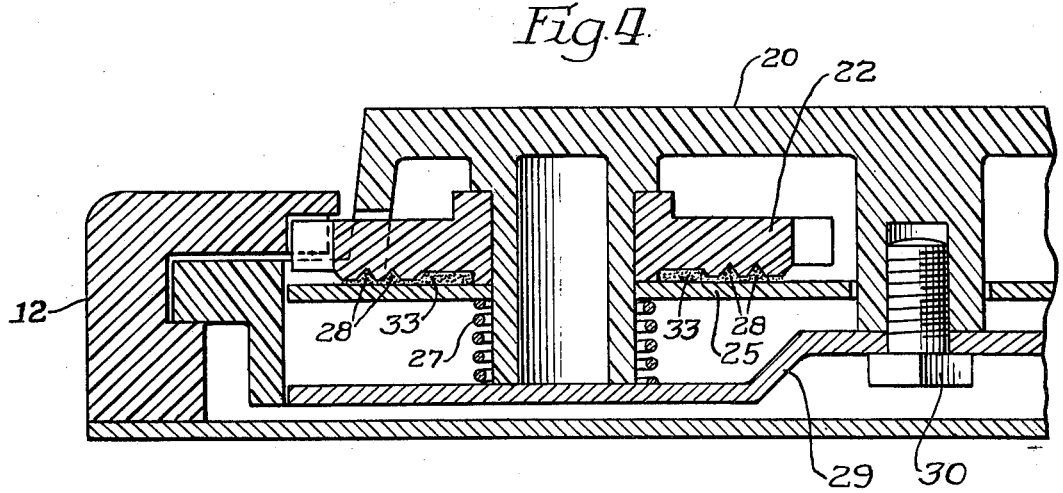
FIG. 4 is an enlarged partial cross-sectional view of the pusher assembly as shown in FIG. 3.
Figure 5:
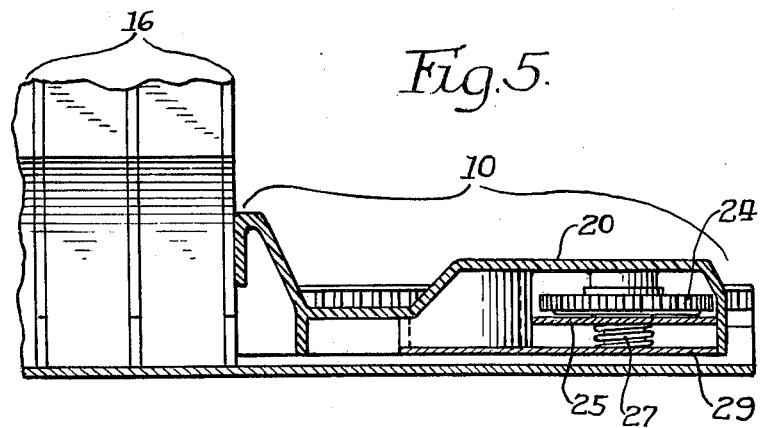
FIG. 5 is a longitudinal cross-sectional view of the pusher assembly taken along lines 5—5 of FIG. 2.

A film cassette indexing assembly is shown generally in FIG. 1. As there illustrated, a pusher assembly 10 abuts at least one of an assembly of cassettes 16 which cassettes are arranged for displacement along guides 12 and 14 configured as U-bracket guide means. The pusher assembly 10 including a housing or cover portion 20, provides biasing means for displacing the cassettes relative to the guide means which are stationary relative to a not shown indexing station past which the cassettes are indexed. The guide means or side guides are provided stationary teeth 21 which mesh with gear teeth on restrainer gears 22 and 24. Coupled between the pusher assembly 10 and at least one of the guides 12, 14 is a negator spring 26 which supplies displacement force to move the pusher assembly.

The restrainer gears 22 and 24 are coupled to the housing of the pusher assembly 10. Each restrainer gear revolves about a shaft 23 which is an integral part of the pusher assembly housing. As the pusher 10 is displaced within the guides, the restrainer gears rotate since the gear teeth are meshed with the stationary teeth 21 of the guides.

A pressure plate 25 is lodged against each restrainer gear hub by a coiled spring 27, which springs are compressed by an assembly plate 29 which is secured to the assembly housing 20 by means of screws 30. Interposed between the lower side of each gear body and the pressure plate is a viscous medium 33, typically a silicone grease. As illustrated, the restrainer gears 22 and 24 are provided with circular grooves 28 concentric with the axis of the gears for retention of the interposed viscous medium. In addition to providing retention means, test results indicate that gears which are grooved produce a 10 to 15 per cent increase in drag resistance.

It should be noted that pressure plate 25 is pushed against the hub of each restrainer gear 22, 24. This arrangement provides a means for maintaining parallelism between the restrainer gears and the pressure plate 25 in addition to providing a controlled space in which the viscous medium 33 is interposed. Optimum system results are obtained when the variation in distance between gear and pressure plate is kept to a minimum.

As mentioned previously, a desirable characteristic of the restrainer assembly is to reduce acceleration without significantly reducing displacement force. An ordinary friction device or slipclutch would not perform this function satisfactorily since the restraining force produced by such a device would be present at all times and would oppose and effectively reduce the applied displacement force. The desirable properties of this system are derived from resistive forces which are produced when the restrainer assembly moves and the interposed viscous medium is sheared. Since frictional forces within the restrainer assembly are undesirable, the restrainer gears are designed to minimize their effects. Friction is present between the gear hub and the pressure plate. The viscous medium is interposed between the gear and the pressure plate. As the gear rotates, the viscous medium shears and torque is produced about the gear's axis of rotation. Since torque is a product of force times moment arm, the torque produced by the viscous medium is large compared to that produced by friction forces at the hub because the shear forces act through a long moment arm while the friction forces act through a short one.

As the pusher assembly is displaced and the restrainer gears rotate, the viscous medium is sheared as the gear body revolves relative to the fixed pressure plate.

The force required to shear a given quantity of liquid matter is proportional to shear speed and is represented by the equation:

$$F = KV$$

where F is the shear force
K is a constant
V is the relative shear velocity

In operation, the spring loaded pusher begins to accelerate as a release mechanism allows the cassettes to be displaced. The restrainer gears begin to revolve as the pusher accelerates since the gear teeth are meshed with the guide teeth. As the velocity of the pusher increases, so does the angular velocity of the restrainer gears. Since the resistive shear force is a function of and directly proportional to shear speed, the resistive shear force also increases. The pusher velocity continues to increase until an equilibrium condition develops between the force applied to the pusher and the restraining force supplied by the shearing of the viscous medium. When this condition is reached, the pusher no longer accelerates but instead maintains a constant velocity.

Pusher velocity can be altered by changing any of the following parameters:
1. the viscous medium used,
2. the shear area of the viscous medium,
3. the pressure applied to the pressure plate,
4. the spring force applied to the pusher assembly.

In summary, the negator springs provide bias means for displacement of the pusher and cassettes, the side guides provide guide means for longitudinal motion of the pusher and cassettes, the gears provide relative motion which shears the interposed medium as the pusher is displaced, and the shear resistance restrains the bias means as the velocity of the pusher increases. Pusher velocity regulation is thus achieved without a significant reduction in pusher force.

Various changes and modifications could be made in the above described method and apparatus without departing from the spirit and scope of the present invention as defined in the appended claims.

What is claimed is:

1. An apparatus for regulating the motion of an assembly of cassettes during indexing, comprising:
   means for applying displacement force to at least one of an assembly of cassettes, the displacement means comprising a pusher assembly and spring means coupled thereto;
   means for guiding the direction of displacement of the cassettes during movement by said displacement means; the guide means being arranged to opposite sides of said pusher and said cassette assembly, to permit movement thereof only within said guide means;
   means coupling said spring means to said guide means; and
   means for regulating the velocity of the cassettes during indexing by modifying the acceleration of said displacement means caused by said spring means, the velocity regulating means comprising gear means attached to both displacement means and guide means.

2. The apparatus of claim 1 wherein said velocity regulating means comprises gear means attached to displacement means by shaft means and to guide means by stationary teeth which mesh with said gear teeth.

3. The apparatus of claim 1 wherein a viscous liquid is interposed between said gear means and the frame of said displacement means.

4. The apparatus of claim 3 wherein said gears are provided with at least one groove concentric with the axis of the gear for retention of interposed viscous medium.

5. The apparatus of claim 3 wherein said viscous fluid comprises a silicone grease.

6. An apparatus for regulating the motion of an assembly of cassettes during indexing, comprising:
   means for applying displacement force to at least one of an assembly of cassettes, the displacement means comprising a pusher assembly and spring means coupled thereto:
   means for guiding the direction of displacement of the cassettes during movement by said displacement means; the guide means being arranged to opposite sides of said pusher and said cassette assembly, to permit movement thereof only within said guide means;
   means coupling said spring means to said guide means; and
   means for regulating the velocity of the cassettes during indexing by modifying the acceleration of said displacement means caused by said spring means, the velocity regulating means comprising a viscous medium which produces shear resistance forces.

7. An apparatus for regulating motion and damping acceleration of a film cassette during indexing of the cassette relative to a projection station of a motion picture projector, comprising:

pusher means engaging at least one of a series of substantially aligned cassettes, biasing means urging said pusher means and said cassettes toward said projection station, indexing means releasably restraining said cassettes against movement by said pusher means, and regulating means associated with said pusher means for reduction of acceleration of said pusher means in proportion to said urging force of said biasing means without a corresponding significant reduction in force exerted by said pusher on said cassettes, thereby minimizing the effect of said pusher means on the structural integrity of said cassettes.

8. An apparatus for regulating motion of a plurality of cassettes during indexing, comprising:
   a pusher assembly having two negator springs as a source of energy for displacing said plurality of cassettes,
   at least two guide elements in the shape of U brackets located on opposite sides of the pusher assembly and the plurality of cassettes being indexed allowing movement only within the guides,
   gears connected to said pusher assembly by shaft means and to said guide elements by meshed gear teeth cooperating with silicone grease interposed between one side of each of said gears and the frame of said pusher assembly, whereby said grease shears and provides shear resistance force as the gears rotate with movement of the pusher assembly during indexing of the cassettes.

9. An apparatus for regulating the motion of an assembly of cassettes during indexing of the cassettes relative to an indexing mechanism of a motion picture projector, the invention comprising:
   pusher means engaging at least one of the cassettes of the assembly for displacing said cassettes in an indexing direction;
   stationary guide means for guiding said pusher means and said cassettes during displacement relative to the indexing mechanism; and
   biasing means for urging said pusher means and said cassettes along said guide means; and
   viscous means for regulating the velocity of movement of the cassettes during indexing by damping the acceleration of said pusher means caused by said biasing means.

10. The apparatus of claim 9 wherein said biasing means comprises spring means substantially enclosed within and couples to said pusher means, and attached to said guide means.

11. The apparatus of claim 10 wherein said regulating means comprises gear means coupled to both said pusher means and said guide means.

12. The apparatus of claim 11 wherein said regulating means includes a viscous medium interposed between said gear means and said pusher means to produce shear resistance forces.

13. The apparatus of claim 12 wherein said gear means are provided with at least one groove concentric with the axis of the gear for retention of the interposed viscous medium.

* * * * *